United States Patent
O'Brien et al.

[11] Patent Number: 5,900,530
[45] Date of Patent: May 4, 1999

[54] METHOD FOR TESTING PRESSURE SENSORS

[75] Inventors: Gary J. O'Brien, Phoenix; Andrew C. McNeil, Scottsdale; Mark D. Summers, Phoenix, all of Ariz.

[73] Assignee: Motorola, Inc., Schaumburg, Ill.

[21] Appl. No.: 08/979,331

[22] Filed: Nov. 24, 1997

Related U.S. Application Data

[62] Division of application No. 08/509,595, Jul. 31, 1995, abandoned.

[51] Int. Cl.$^6$ .................................................. G01L 27/00
[52] U.S. Cl. .............................................................. 73/1.57
[58] Field of Search ........................................ 73/1.57, 1.58

[56] References Cited

U.S. PATENT DOCUMENTS

| | | |
|---|---|---|
| 3,713,325 | 1/1973 | Brian . |
| 3,927,553 | 12/1975 | Frantz .............................. 137/625.68 X |
| 4,295,117 | 10/1981 | Lake et al. ................................... 338/4 |
| 4,708,012 | 11/1987 | Folk et al. ............................... 29/595 X |
| 4,825,685 | 5/1989 | Breimesser ............................. 73/727 X |
| 4,930,353 | 6/1990 | Kato et al. ................................. 73/727 |
| 5,257,640 | 11/1993 | Delajoud ................................... 137/14 |
| 5,324,181 | 6/1994 | McGoldrick et al. .................. 417/541 |
| 5,377,524 | 1/1995 | Wise et al. ....................... 73/861.42 X |
| 5,461,901 | 10/1995 | Ottestad . |

Primary Examiner—Thomas P. Noland
Attorney, Agent, or Firm—Rennie William Dover

[57] ABSTRACT

Pressure sensors that are fabricated to sense low pressures are tested and calibrated by providing a controlled gas flow or leak to create a pressure during testing. Rather than placing the pressure sensor in a sealed environment, a controlled leak of a gas is used to induce a stable and controllable pressure region over the pressure sensor during testing. The stable low pressure region is monitored via a sensing tube.

19 Claims, 2 Drawing Sheets

METHOD FOR TESTING PRESSURE SENSORS

This is a division of application Ser. No. 08/509,595, filed Jul. 31, 1995 and now abandoned.

BACKGROUND OF THE INVENTION

This invention relates, in general, to an apparatus and method of testing pressure sensors, and more particularly, an apparatus and method of testing pressure sensors at low pressures.

Semiconductor pressure sensors are used to provide an electrical value indicative of the pressure being exerted on the sensor. The pressure sensor is typically comprised of a diaphragm and piezoresistive strain sensors positioned on or near the diaphragm which are connected in a circuit to measure the diaphragm deflection due to the pressure differential across the diaphragm.

Presently, pressure sensors are tested after final assembly of the devices. The devices are placed in a sealed pressure chamber that contains testing equipment. The pressure sensors are not only tested but calibrated using a laser trimming process. If the electrical properties measured from the device are high or low, resistors incorporated into the diaphragm are laser trimmed until the voltage is within the range for the given pressure.

This method is adequate for testing of high pressure devices at greater than approximately 10 kPa. However, the testing of low pressure sensors in this manner is both inaccurate and slow. The equipment used to test low pressure devices in the past utilized the modulation of a valve to supply a gas at low pressure to a sealed pressure chamber. This valve has induced instability at low pressures. Thus, a controllable, stable, low pressure test apparatus is needed for testing devices at 10 kPa and below. In addition, the procedure used in the past had a slow response time because the pressure needs to be stabilized over a period of approximately several minutes. This amount of time is unacceptable in high throughput manufacturing areas. Thus, it would be desirable to have a testing apparatus and process which improves the cycle time of those processes commercially available.

DETAILED DESCRIPTION OF THE DRAWINGS

An apparatus and method of testing and calibrating pressure sensors at low pressures is carried out by the use of a system which delivers low pressure to the pressure sensor utilizing a "dynamic" pressure test rather than a "static" pressure test. The procedure of the present invention is termed "dynamic" because a gas flows over the sensor during testing, thus the creation of the stable pressure is not created in a sealed or "static" environment where no gas is flowing over the sensor during testing. Rather than placing the pressure sensor in a sealed environment, a controlled leak of a gas is used to induce a stable and controllable pressure region over the pressure sensing element of the pressure sensor. The stable low pressure region is monitored via a sensing tube. The use of a controlled gas flow or leak of the present invention allows for testing of pressure sensors at low pressures. The use of a sealed environment to create a pressure introduced instabilities, inaccuracies and long test times.

Figure 1:
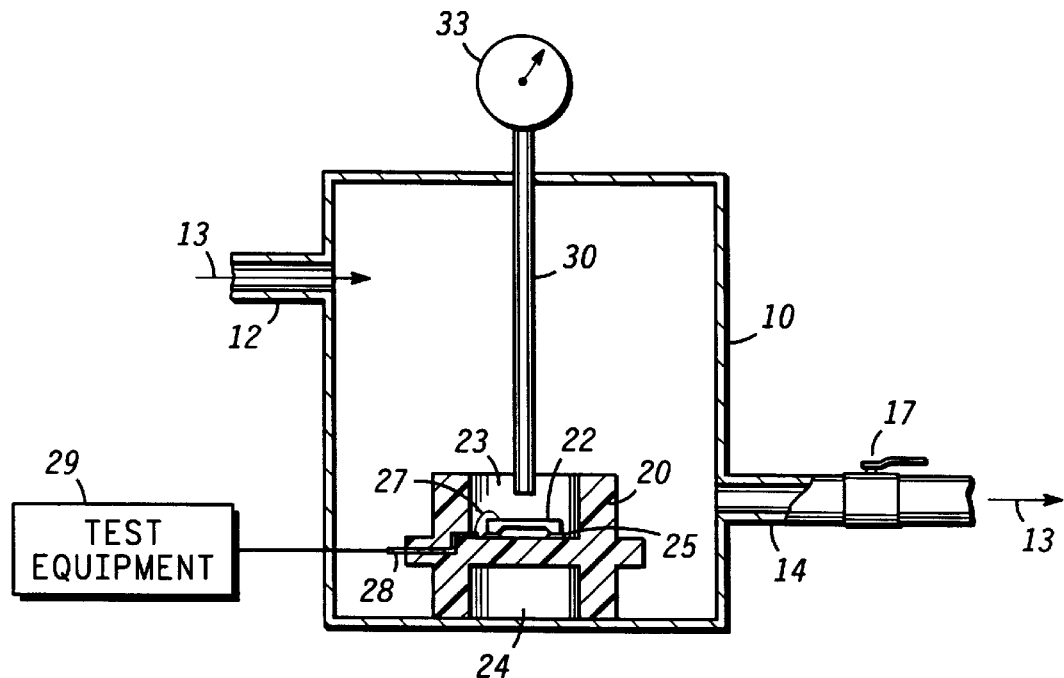
FIG. 1 illustrates a first embodiment of the present invention.

FIG. 1 illustrates a first embodiment of the present invention. What is shown is a chamber or fixture 10 in which at least a portion of pressure sensor package 20 is placed. Although illustrated as such, pressure sensor package 20 does not have to be, but may be, sealed to the walls of chamber 10. Pressure sensor package or housing 20 houses pressure sensor 22 which is bonded to package 20 through a seal 25. This embodiment illustrates an absolute or fixed pressure sensor because it senses pressure at the front side of the sensor die with the pressure on the back side of the sensor die being constant (either a vacuum or fixed pressure). An opening or cavity 23 to the front side of pressure sensor 22 allows for sensing of the media on pressure sensor 22. In this embodiment, pressure sensor 22 will be tested on the front side through opening 23.

Figure 4:
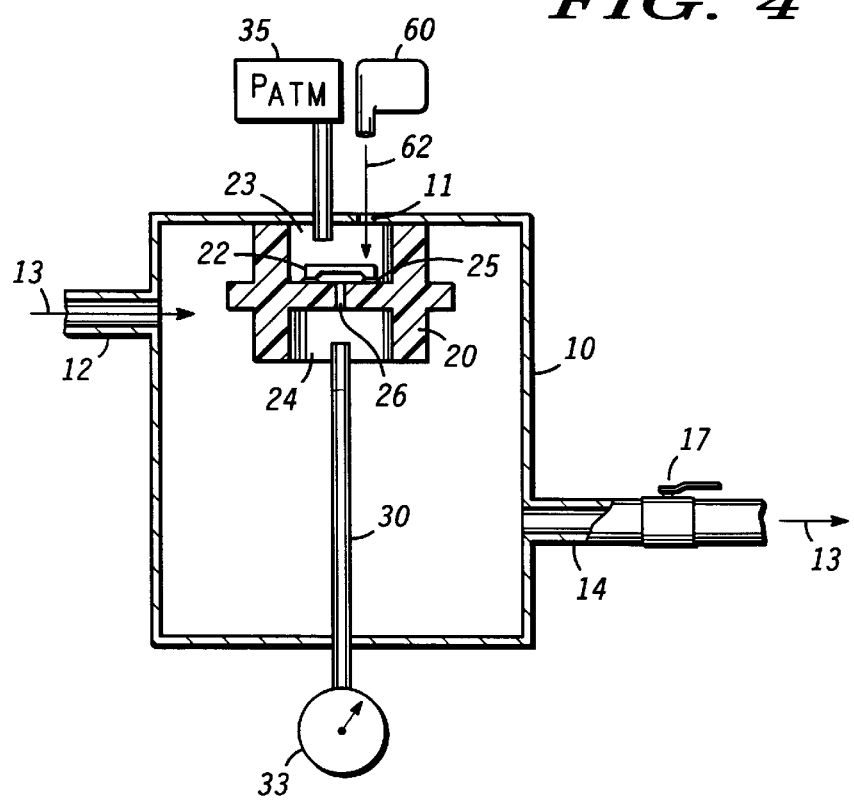
FIG. 4 illustrates a fourth embodiment of the present invention.

It should be noted that the configuration of package 20 is not a limitation of the invention. If pressure sensor 22 were a differential pressure sensor, opening or cavity 24 in package 20 would lead to the back side of pressure sensor 22 through a hole 26 (not shown) in package 20 (as shown in FIG. 4). This allows for pressure testing through the back side of pressure sensor 22. The testing of a differential pressure sensor, comprising a hole 26 in package 20 may also be performed by the apparatus and method of the present invention, but the opening 24 would have to be exposed to atmospheric (or guage) pressure as shown in FIG. 4.

Chamber 10 is the means for supplying a stable, low pressure to pressure sensor 22. Chamber 10 has an inlet 12 through which a gas 13 enters chamber 10. An outlet 14 allows gas 13 to exit therethrough. A valve 17 is positioned in the exit 14. Valve 17 is always open during testing of pressure sensor 22. It is important to note that pressure sensor 22 is not tested in a sealed environment as done in the past. The open valve 17 allows for a controlled amount of flow of gas 13 therethrough in order to form a stable, low pressure in the vicinity of pressure sensor 22. In one example, the flow rate of gas 13 is approximately 150 standard cubic feet per hour or less during testing.

A sensing tube 30 is positioned proximate to pressure sensor 22. Sensing tube 30 is coupled to a measurement apparatus 33 which measures the pressure close to pressure sensor 22. Measurement apparatus 33 may be comprised of a pressure calibrator or other measuring device. Pressure calibrators are available on the commercial market from manufactures such as Druck, Ruska, or Mensor. Sensing tube 30 is preferably of a diameter less than or equal to the width of opening 23 so that sensing tube 30 may be positioned close to pressure sensor 22. In this embodiment, the end of sensing tube 30 is preferably placed inside the edge of opening 23 in order to provide more accuracy in sensing the pressure on pressure sensor 22. Placing sensing tube 30 outside opening 23 may also be suitable in certain applications.

A desired pressure can be obtained by adjusting the flow of gas 13 or adjusting valve 17. Once the desired stable pressure is achieved above die 22 an excitation voltage is supplied by test equipment 29 to the transducer (not shown) fabricated on pressure sensor 22 via electrical lead 28 and electrical interconnect 27. Electrical interconnect 27 is shown as a wire bond in this embodiment, however, other types of electrical interconnection can be used. A difference voltage is generated at the transducer which is proportional to the applied stable pressure. This difference voltage is monitored by test equipment 29 which is coupled to electrical lead 28.

Figure 2:
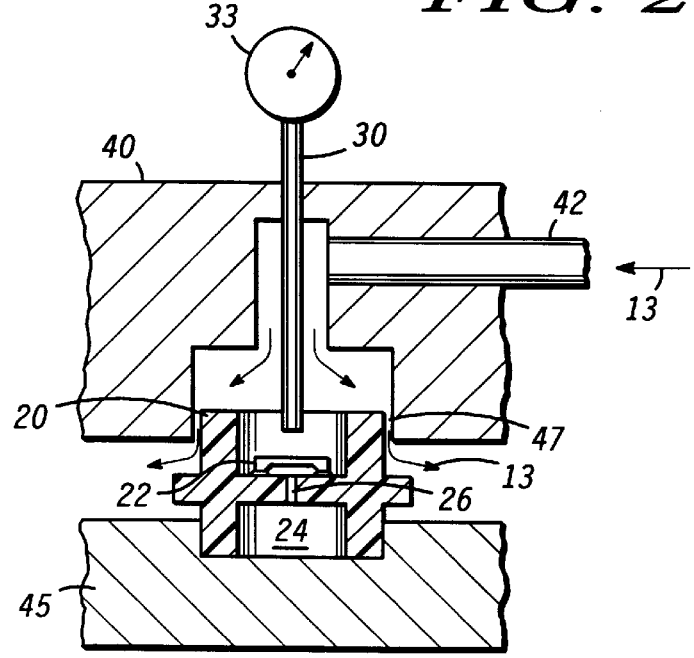
FIG. 2 illustrates a second embodiment of the present invention.

FIG. 2 illustrates a second embodiment of the present invention. The same or similar elements are designated by the same numerals as shown in FIG. 1. The apparatus of FIG. 2 is preferred over that of FIG. 1 because testing may be done before the devices are singulated from a lead frame rail. Pressure sensor package 20 is held in position by a base 45. Although illustrated as such, pressure sensor package 20 does not have to be, but may be, sealed to the base 45. Optionally, opening 24 can be exposed to atmospheric or gauge pressure as shown in FIG. 4 for differential pressure applications. In this embodiment, a flow fixture 40 is used instead of a chamber 10. Flow fixture 40 is comprised of an inlet 42 and is configured so that when it is coupled with pressure sensor package 20, a sealed environment within which pressure sensor package 20 is positioned is not formed.

During testing, flow fixture 40 is positioned above pressure sensor package 20 so that a gap or opening 47 is formed to allow gas 13 to flow therethrough. Flow fixture 40 can be described as a chamber with only a portion of pressure sensor package 20 disposed therein. A controlled leak of gas 13 is thus formed during testing. Different sizes of gap 47 can be used to achieve the same pressure by adjusting the flow rate of gas 13. In fact, fixture 40 may be positioned above package 20 without having the end of fixture 40 overlap package 20.

Note that other means for allowing gas 13 to escape during testing can be used. For example, an opening with a valve (not shown) formed directly in flow fixture 40 may be used, where flow fixture 40 would be in physical contact and sealed with pressure sensor package 20 so that no gap or opening 47 is provided. Having flow fixture 40 be in physical contact with pressure sensor package 20 is not as desirable because extra stress is placed on pressure sensor package 20. Operating or testing conditions can be that as disclosed above with reference to FIG. 1. However, in this embodiment, the desired pressure can be obtained by adjusting gap 47 instead of adjusting valve 17. For illustrative convenience, the elements for performing the electrical tests have been left out from this and subsequent FIGS.

Figure 3:
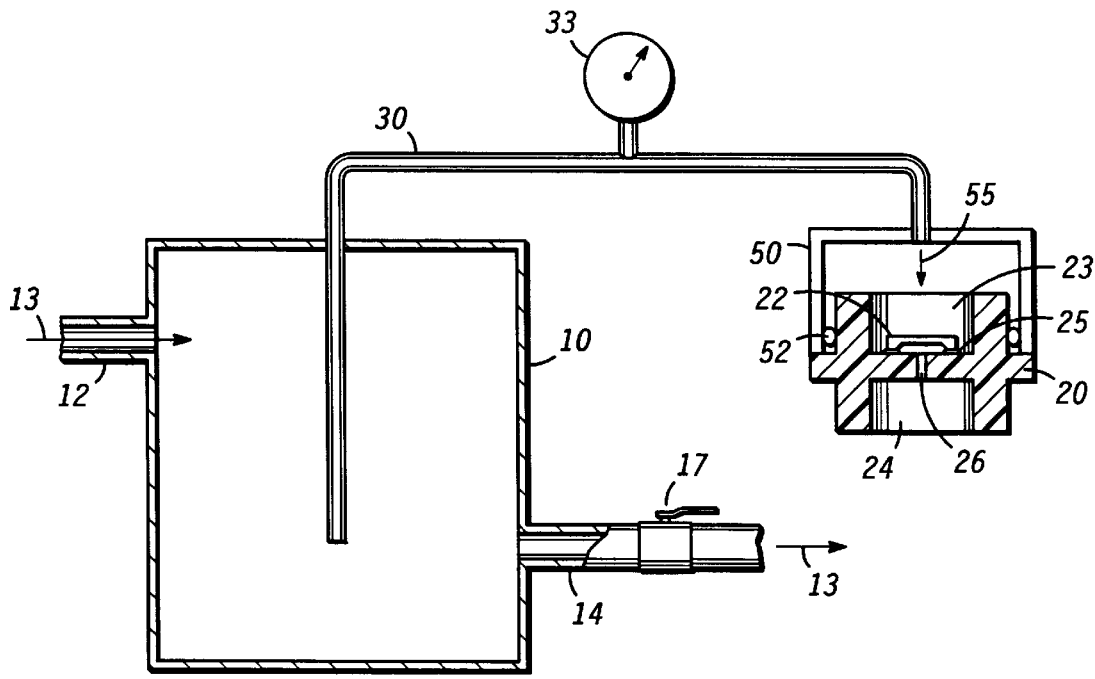
FIG. 3 illustrates a third embodiment of the present invention.

FIG. 3 illustrates a third embodiment of the present invention. The same or similar elements are designated by the same numerals as shown in FIG. 1. Here, pressure sensor package 20 is not placed inside chamber 10, but coupled to a sealable flow fixture 50 which is coupled to pressure sensing tube 30. Sealable flow fixture 50 is positioned over pressure sensor package 20. Sealable flow fixture 50 is comprised of seals 52 which prevents any gas 55 from escaping. Gas 55 is static in nature above the surface of pressure sensor 22. Because the testing apparatus is sealed to sensor 22, the position of sensing tube 30 is not critical. In this embodiment, the controlled leak of gas 13 is not formed in close proximity to pressure sensor package 20. However, the end result is the same as previous embodiments in that a low, accurate, and controlled pressure is formed and provided to test pressure sensor 22.

FIG. 4 illustrates a fourth embodiment of the present invention. The same or similar elements are designated by the same numerals as shown in FIG. 1. In this embodiment, pressure sensor 22 is tested by introducing the flow of gas 13 on backside 24 of pressure sensor package 40. Opening 26 in package 40 allows for gas 13 to flow to pressure sensor 22. In this embodiment, the end of sensing tube 30 is preferably placed within opening 24 of package 20, but may provide adequate results if placed outside of opening 24. Additionally, opening 24 is subjected to atmospheric pressure 35 and in this case, package 20 must be sealed to the wall of chamber 10 to separate atmospheric pressure 35 from the pressure in chamber 10.

This embodiment also illustrates calibration of pressure sensor 22. In this embodiment, a laser trim apparatus 60 generates a laser beam 62. Laser beam 62 penetrates through a window 11 formed in chamber 10 to perform the calibration of pressure sensor die 22. It is well known in the art, that calibration is performed by trimming resistors formed in pressure sensor 22. This embodiment takes advantage of the fact that sensing tube 30 is positioned on the back side of pressure sensor package 20, thus sensing tube 30 and laser trim apparatus 60 are not placed on the same side of chamber 10 (or flow fixtures 40 or 50) thus allowing for unrestricted placement of sensing tube 30. Note that flow fixtures 40 or 50 shown in FIGS. 2 and 3, respectively may be used in this embodiment to perform pressure testing through the backside of pressure sensor 22 and to calibrate the pressure sensor 22.

As can be seen, an apparatus and method for testing pressure sensors at low pressures has been provided.

What is claimed is:

1. A method of testing a sensor, comprising the steps of:
    providing the sensor;
    providing a flow of a gas in a chamber to create a pressure, the chamber having a controlled leak during testing of the sensor, wherein the leak is controlled by placing a fixture over the sensor with a gap between the fixture and the sensor;
    obtaining a desired pressure by adjusting a size of the gap between the fixture and the sensor;
    supplying the pressure to the sensor;
    measuring the pressure; and
    measuring an electrical output of the sensor.

2. The method of claim 1 further including the step of calibrating the sensor.

3. The method of claim 1 further including the step of calibrating the sensor by laser trimming a resistor incorporated into the sensor.

4. The method of claim 1 further including the step of calibrating the sensor while testing the sensor in the chamber.

5. A method of testing a sensor, comprising the steps of:
    providing a fixture having an inlet and an outlet;
    placing at least a portion of the sensor in the fixture;
    providing a flow of a gas through the inlet of the fixture while the sensor is being tested by placing the fixture over the sensor with a gap between the fixture and the sensor to provide the outlet, the flow of the gas moving out the outlet of the fixture while the sensor is being tested;
    measuring a pressure proximate to the sensor; and
    testing the sensor to measure an electrical output of the sensor.

6. The method of claim 5 further including the step of calibrating the sensor.

7. The method of claim 5 wherein the step of providing the sensor further comprises the sensor sensing a pressure of 10 kPa and below.

8. The method of claim 5 wherein the step of providing the flow of the gas comprises providing a flow of a gas of approximately 150 standard cubic feet per hour or less.

9. The method of claim 5 wherein the step of measuring the pressure comprises positioning a sensing tube coupled to a pressure calibrator proximate to the sensor.

10. The method of claim 5 further including the step of calibrating the sensor by laser trimming a resistor incorporated into the sensor.

11. The method of claim 5 further including the step of calibrating the sensor while testing the sensor in the chamber.

12. A method for testing a sensor within a sensor package, comprising the steps of:

providing a flow fixture having an inlet and a chamber;

placing the sensor package on a sensor support wherein the flow fixture is above the sensor package;

moving the flow fixture towards the sensor package, wherein a portion of the sensor package is inside the chamber of the flow fixture and wherein a gap is present between the chamber, the sensor package and the sensor support;

providing a flow of a gas through the inlet of the fixture and out of the gap between the flow fixture and the sensor package;

controlling the pressure proximate to the sensor; and testing the sensor to measure an electrical output of the sensor.

13. The method of claim 12, wherein the step of controlling the pressure proximate to the sensor includes adjusting a size of the gap between the flow fixture and the sensor package.

14. The method of claim 12, further including the steps of:

moving the flow fixture away from the sensor package; and replacing the sensor package with another sensor package.

15. The method of claim 12, wherein the step of placing the sensor package on the sensor support includes placing a sensor package on the sensor support before the sensor package has been singulated from a lead frame rail.

16. The method of claim 12, wherein the step of providing the sensor further comprises the sensor sensing a pressure of 10 kPa and below.

17. The method of claim 12, wherein the step of providing the flow of the gas comprises providing a flow of a gas of approximately 150 standard cubic feet per hour or less.

18. The method of claim 12, wherein the step of measuring the pressure comprises positioning a sensing tube coupled to a pressure calibrator proximate to the sensor.

19. The method of claim 12, further including the step of calibrating the sensor while testing the sensor in the chamber.

* * * * *